US012584876B2

(12) United States Patent
Daniel

(10) Patent No.: US 12,584,876 B2
(45) Date of Patent: Mar. 24, 2026

(54) CONTINUOUS WHOLE-HOME WATER QUALITY ANALYZER

(71) Applicant: Notation Labs, Inc., Scottsdale, AZ (US)

(72) Inventor: David A. Daniel, Scottsdale, AZ (US)

(73) Assignee: Notation Labs, Inc., Scottsdale, AZ (US)

( * ) Notice: Subject to any disclaimer, the term of this patent is extended or adjusted under 35 U.S.C. 154(b) by 0 days.

(21) Appl. No.: 18/896,823

(22) Filed: Sep. 25, 2024

(65) Prior Publication Data

US 2025/0102455 A1     Mar. 27, 2025

Related U.S. Application Data

(60) Provisional application No. 63/540,925, filed on Sep. 27, 2023.

(51) Int. Cl.
    *G01N 27/06*     (2006.01)
    *G01N 27/04*     (2006.01)
    *G01N 27/624*     (2021.01)

(52) U.S. Cl.
    CPC ........... *G01N 27/06* (2013.01); *G01N 27/045* (2013.01); *G01N 27/624* (2013.01)

(58) Field of Classification Search
    CPC ..... G01N 27/06; G01N 27/045; G01N 27/624
    See application file for complete search history.

(56) References Cited

U.S. PATENT DOCUMENTS 10,473,498 B2 * 11/2019 Momose ................... G01F 1/60
2007/0083127 A1 * 4/2007 Merrick .................. H01J 49/42
                                        250/281

2015/0260693 A1 * 9/2015 DeMarco ............... H05B 45/10
                                     324/693
2015/0338359 A1 * 11/2015 Baxi ...................... G01N 27/07
                                     324/693
2021/0208101 A1 * 7/2021 Aldayeh ................ G01N 27/70

FOREIGN PATENT DOCUMENTS

CN       111649477 A  *  9/2020  ............. F24H 1/201
KR       101818072 B1 *  1/2018  ........... G01N 33/182

OTHER PUBLICATIONS

Lee Byoung et al.; Apparatus For Measuring Total Dissolved Solid In Water; Date Published Jan. 12, 2018; KR 101818072 B1; Tempus Inc; (Year: 2018).*
Kim Jae Hoon et al.; Water Quality Sensor and Water Treatment Apparatus Having the Same; Publication Date Jun. 8, 2017; Coway Co Ltd; Publication KR20170063065A; (Year: 2017).*

* cited by examiner

*Primary Examiner* — Nasima Monsur
(74) *Attorney, Agent, or Firm* — CM Law LLP; Robert C. Klinger

(57) ABSTRACT

A fluid quality detector for measuring total dissolved solids such as in water system of a home. The detector includes a body configured to communicate a fluid between an inlet and an outlet, and a probe having a pair of electrodes configured to communicate with the fluid. A circuit is coupled to the probe and configured to determine quality of the fluid as it communicates between the inlet and the outlet. The circuit is configured to apply a voltage waveform between the two electrodes to the fluid and switch a voltage polarity of the voltage waveform to reverse voltage polarity at the electrodes and reduce ions from migrating between the electrodes.

15 Claims, 10 Drawing Sheets

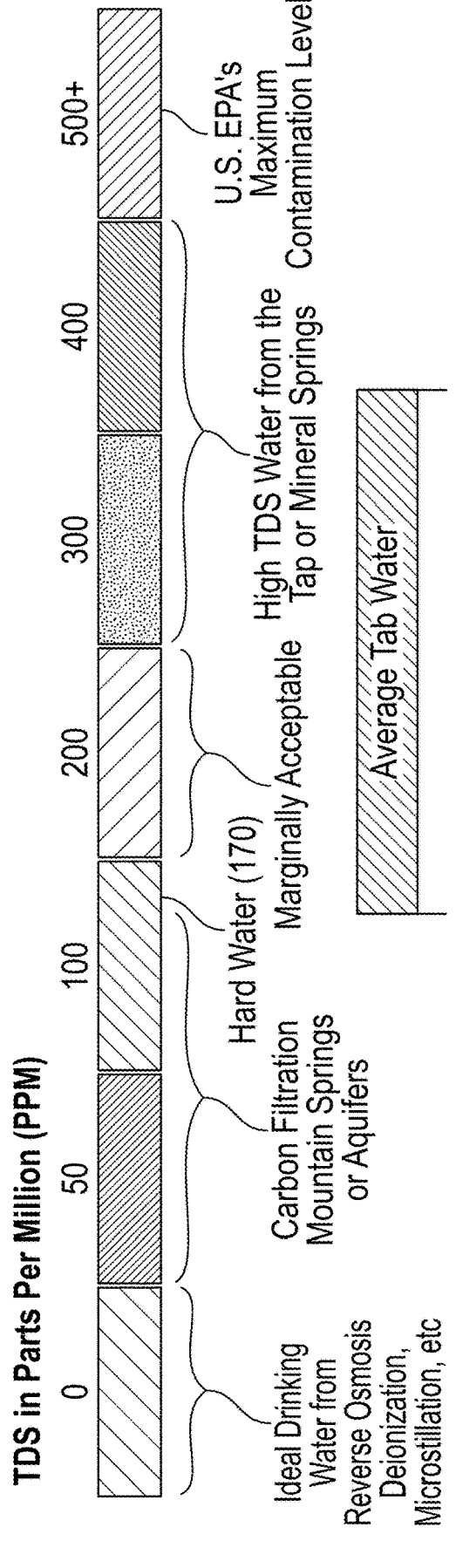

TDS in Parts Per Million (PPM)

200

0   50   100   200   300   400   500+

Ideal Drinking Water from Reverse Osmosis Deionization, Microstillation, etc

Carbon Filtration Mountain Springs or Aquifers

Hard Water (170)
Marginally Acceptable

High TDS Water from the Tap or Mineral Springs

Average Tab Water

U.S. EPA's Maximum Contamination Level

\* Chart Values Represent National U.S. Averages. Actual TDS Levels for Geographic Regions within the U.S. and Other Countries May Vary.

FIG. 2

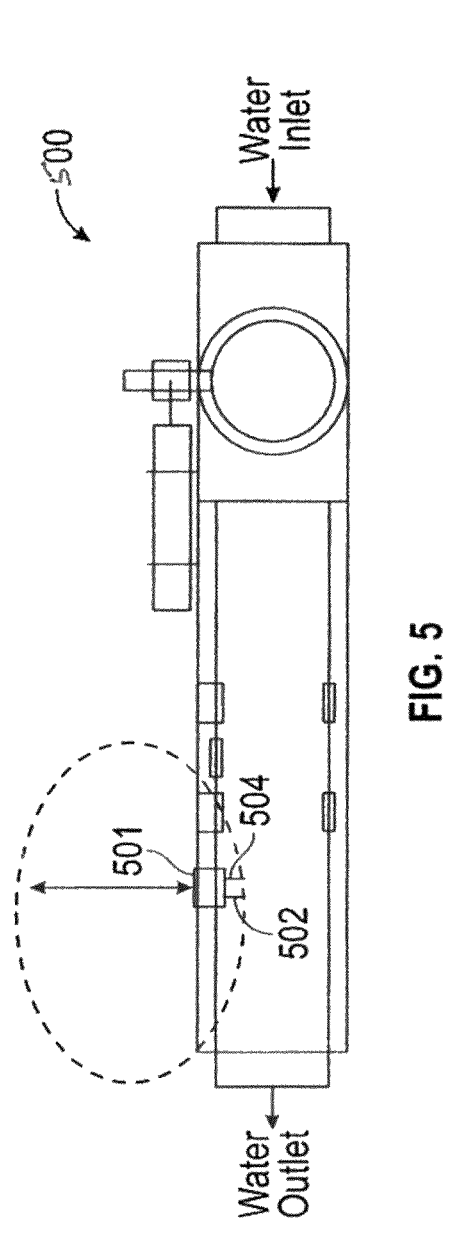

500

Water
Inlet

501

504

502

Water
Outlet

| Resistivity | |
|---|---|
| Common Symbols | $\rho$ |
| SI Unit | ohm Meter ($\Omega$.m) |
| In SI Base Units | $kg.m^3.S^{-3}.A^{-2}$ |
| Derivations from Other Quantities | $\rho = R\frac{A}{\ell}$ |
| Dimension | $ML^3T^{-3}I^{-2}$ |

| Conductivity | |
|---|---|
| Common Symbols | $\sigma, k, \gamma$ |
| SI Unit | Siemens per Meter (S/m) |
| In SI Base Units | $kg^{-1}.m^{-3}.S^3.A^2$ |
| Derivations from Other Quantities | $\sigma = \frac{1}{\rho}$ |
| Dimension | $M^{-1}L^{-3}T^3I^2$ |

Given:   Measured Resistance:   Rmeas : 3500 ohms
         Conductivity Based on the Measured Resistance:

$$Cond := \frac{1}{Rmeas} \cdot 10^6$$

$$Cond = 285.714 \ \mu S$$

Distance Between Probe Electrodes:     $\Delta := 2 \ cm$

Surface Area of an Electrode:

Length of Electrode Metal rod:   $Rod\_L := 6 \ cm$
Diameter of Electrode Metal rod:   $Rod\_d := 1 \ cm$
Approximate Surface Area of the Electrode:   $cm^2$ $$SA := \pi \cdot \frac{rod\_d}{2} \cdot rod\_L$$

$$SA = 0.094$$

Cell Constant:     $CC := \frac{\Delta}{SA}$     $CC = 2.122$

Specific (Corrected) Conductivity:     $SC := Cond \cdot CC$ $$SC = 606.305 \qquad \mu S$$

MEASURE  Freq[1]=2.40kHz  Ampl[1]=2.72V

1200

CH1     RMS[1]=1.93V     Freq[2]=***

CONTINUOUS WHOLE-HOME WATER QUALITY ANALYZER

TECHNICAL FIELD

This disclosure relates generally to the field of whole-home electronic water control systems, in particular water leak detection, and water analytics.

BACKGROUND

Water leak-related property damage causes homeowners billions of dollars in damage every year in the United States alone. The single most important factor in mitigating property damage caused by leaks is the amount of time it takes for the leak to be discovered and the water shutoff. The longer it takes to respond, the greater the damage incurred. Water quality is also a problem as poor water quality can be a health issue for users.

BRIEF DESCRIPTION OF THE FIGURES

FIG. 2 illustrates total dissolved solids (TDS) as a common measure of how much material is dissolved or suspended in water;

FIG. 5 illustrates the water quality detector having a water quality sensor probe having separated electrodes;

FIG. 6 illustrates parameters of resistivity and conductivity;

FIG. 9 illustrates design specifics for the probe including associated calculations;

DETAILED DESCRIPTION

A fluid quality detector for measuring total dissolved solids such as in a water system of a home. The fluid quality detector includes a body configured to communicate a fluid between an inlet and an outlet, and a probe having a pair of electrodes configured to communicate with the fluid. A circuit is coupled to the probe and configured to determine quality of the fluid as it communicates between the inlet and the outlet. The circuit is configured to apply a voltage waveform between the two electrodes to the fluid and switch a voltage polarity of the voltage waveform to reverse voltage polarity at the electrodes and reduce ions from migrating between the electrodes. A single voltage rail is used and the body is comprised of an electrically non-conductive material such that the body does not need to be grounded.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and circuitry have been described at a relatively high-level, without detail, in order to avoid unnecessarily obscuring aspects of the present teachings.

It is to be understood that the figures and descriptions of the present disclosure have been simplified to illustrate the details that are relevant for a clear understanding of the present disclosure, while eliminating, for the purpose of clarity, certain details found in the supporting electronics. Those of ordinary skill in the art will recognize that other details are required in implementing the present disclosure. However, because these other details are well known in the art, and do not add to the understanding of the present disclosure, a discussion of these details is not provided herein.

The term "coupled" as used herein refers to any logical, optical, physical or electrical connection, link or the like by which signals, or light produced or supplied by one system element are imparted to another coupled element. Unless described otherwise, coupled elements or devices are not necessarily directly connected to one another and may be separated by intermediate components, elements or communication media that may modify, manipulate or carry the light, sound, or signals.

Figure 1:
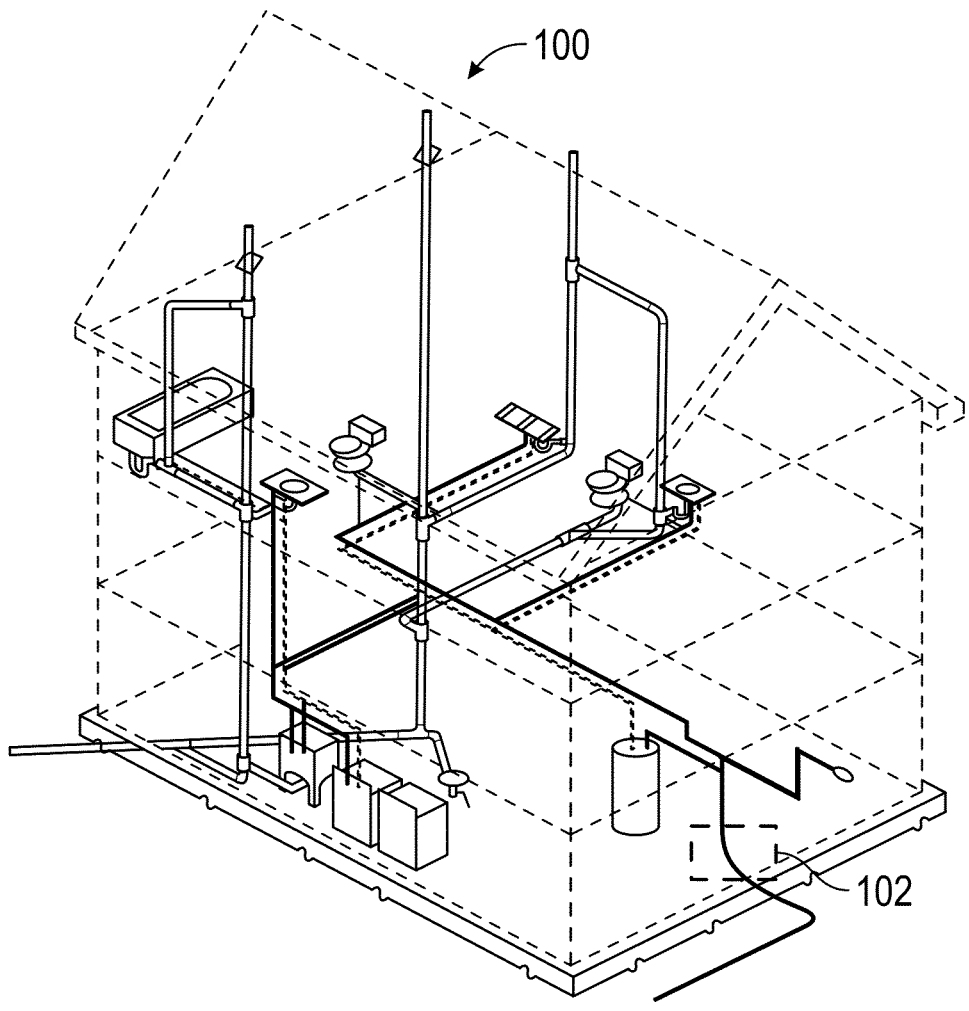
FIG. 1 is a perspective view of a home having a leak detector and water quality detector installed in-line with the main water entry to home.

Whole-home water leak detectors are a particular type of leak detector that is installed on the main water line at the entry to the home, generally after sprinkler systems but before other plumbing fixtures of the home. FIG. 1 illustrates a home 100 having a leak detector 102 installed in-line with the main water entry to home 100.

Leak detectors in a simple form consist of electronics and onboard software configured to control the leak detector and a flowmeter to determine water flow through the leak detector. Some leak detectors only detect leaks and then trigger an alarm to alert the homeowner but take no further action. However, many leak detectors also incorporate a motorized valve (they are installed in-line) to enable automatic and manual opening and closing (shutoff) of the water line to the home in the event a leak is detected. Automatic shutoff valves ensure a quick response time to limit damage in the event of a water leak.

Smart leak detectors make it easier and more convenient for homeowners to detect water leaks. The term "smart" in the context of leak detection typically means the leak detector is connected via a communication network to a backend server where water flow analysis is performed. Such analysis may or may not include some sort of machine learning to interpret and respond based on the water flow data. Smart leak detectors typically come with companion software applications ("apps") that provide water usage monitoring. Water flow data collected from the leak detector is presented in the app in summary form to the user, typically in the form of a chart. Users can use this feature to view detailed records of the leak event and also track their water usage over time.

Water quality is an ongoing concern as human populations grow and industrial and agricultural activities expand.

Minerals, contaminants, and sediments find their way into water supplies affecting water quality including the water's color, clarity, odor, and taste.

As shown in FIG. 2 at 200, total dissolved solids (TDS) is a common measure of how much material is dissolved or suspended in water and is a secondary indicator of overall water quality. TDS is typically defined as parts-per-million (ppm) or milligrams per liter of water (mg/L). The TDS value reflects the combined total of all organic and inorganic substances found in the water supply. The higher the TDS value, the more soluble solids are dissolved in the water, and in general, the less clean the water is. Excessive concentrations of dissolved solids are also usually indicative of hard water. Hardwater has the undesirable effect of leaving deposits and films on plumbing fixtures and can accelerate corrosion.

The TDS in drinking water comes from various sources, natural and because of human activity. Natural TDS sources include but are not limited to rivers, springs, lakes, soil/ rocks, and plants. Human-related sources include urban and agricultural run-off: water treatment plants, wastewater effluent, hardware and piping used to distribute water supplies.

Organic substances of concern found in drinking water include but are not limited to microorganisms, algae, bacteria, fungi, pesticides and herbicides, fertilizers, disinfectants, and pharmaceuticals. Inorganic substances of concern found in drinking water include but are not limited to arsenic, lead, mercury, chlorine, sodium, calcium, potassium, magnesium, fluoride.

This disclosure is a novel electronic system design for embedded water quality sensing that lends itself to integration with a whole-home leak detector in a synergistic manner to form a combined whole-home water monitoring system.

Figure 3:
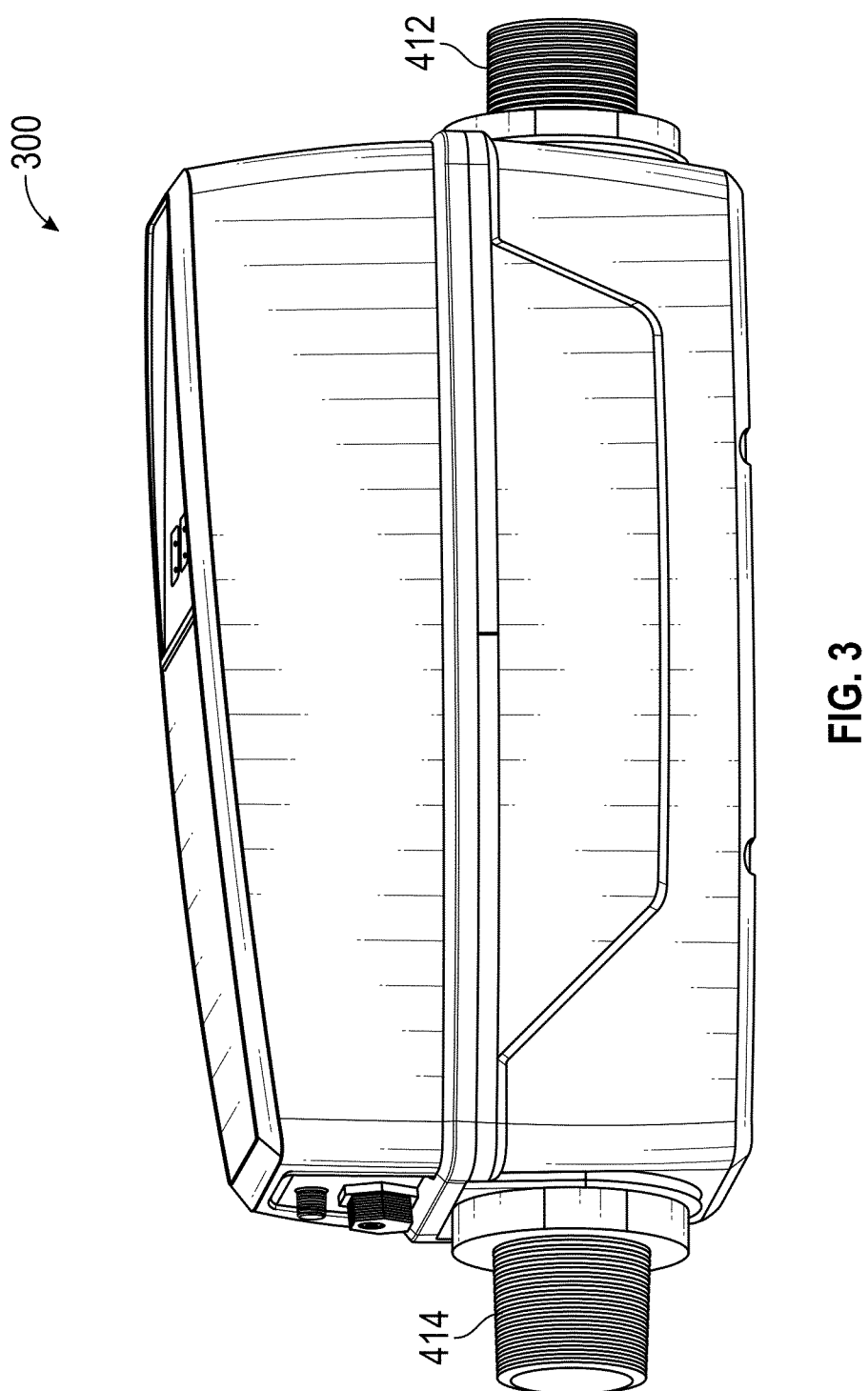
FIG. 3 illustrates a perspective view of a system having a water quality analyzer and a fluid leak detector.

This disclosure includes a flowmeter and a water quality detector 500 (FIG. 5) configured as key sub-system of the whole home water monitoring system 300 as shown in FIG. 3. Water quality detector 500 includes innovations described in further detail including: 1) an embedded passive water quality sensing probe 2) a system generating a stimulus signal that advantageously produces an oscillating current flow between the electrodes using a single rail power supply, and 3) a combined capability with leak detection enabling a whole-home water monitoring solution.

Figure 4:
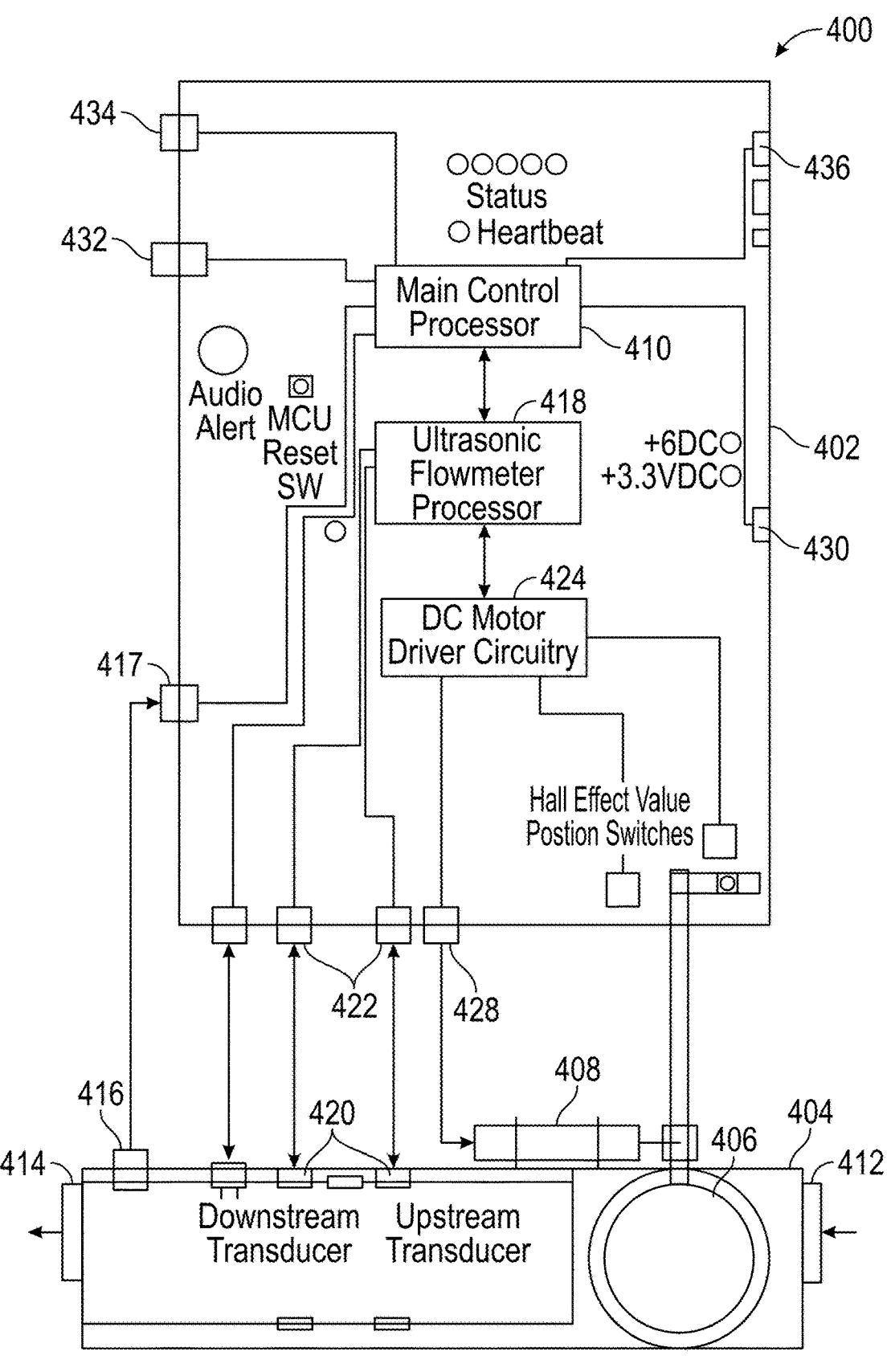
FIG. 4 illustrates a system block diagram of the system including the water quality detector and the leak detector.

A block diagram 400 of system 300 is shown at 400 in FIG. 4 and includes a main control board 402, an electrically non-conductive water sensor housing 404, a shutoff valve 406, a DC gearmotor 408, and processors including main control processor 410. The system 300 is installed in-line between a water source, such as city water or a well, and an outlet, where a water inlet 412 is fluidly coupled to the water source such that input fluid flows through water quality detector 500 to a water outlet 414. A combined water temperature and pressure sensor 416 provides water temperature and pressure of the water flowing through water quality detector 500 via interface 417 to the main control processor 410. An ultrasonic flowmeter processor 418 determines a water flow rate through sensor housing 404 using ultrasonic transducers 420 via an ultrasonic flowmeter interface 422. A DC motor drive 424 controls the DC gearmotor 408 via motor drive interface 428 to control the position of shutoff valve 406. Power is provided to leak detector 300 via power connector 430 which receives a single rail voltage VCC. Main control processor 410 is configured to communicate with external sources via USB interface 432 and interface 434. Main control processor 410 is configured to wirelessly communicate with external sources via wireless interface 436.

FIG. 5 illustrates water quality detector 500 including a water quality sensor probe 501 having electrodes 502 and 504. Passive probe 501 is designed for continuous use by main control processor 410 to determine water quality for use in the whole home water quality analyzer.

Electrical conductivity of water can be converted to an estimate of TDS, and is the general method used in the design for determining the TDS value for a water supply.

EC or Electrical Conductivity of water is its ability to conduct an electric current. Salts and other chemicals that dissolve in water can break down into positively and negatively charged ions.

These free ions in the water conduct electricity, so the water electrical conductivity depends on the concentration of ions. Salinity and TDS are used to calculate the EC of water, which helps to indicate the water's purity. The purer the water the lower the electrical conductivity. Distilled water is essentially an insulator, but saltwater is a very good electrical conductor. Major positively charged ions that affect the conductivity of water are sodium, calcium, potassium, and magnesium. Major negatively charged ions are chloride, sulfate, carbonate, and bicarbonate.

To determine the EC of the water supply in a whole-home application a specially designed probe 501 having electrodes 502 and 504 is located for continuous immersion in the fluid stream communicating from water inlet 412 to water outlet 414. Main control processor 410 causes probe 501 to apply a voltage waveform between the two electrodes 502 and 504 at the tip of probe 501. A drop in voltage across electrodes 502 and 504 and a measured current between the electrodes 502 and 504 is used to calculate resistance of the water between the two electrodes 502 and 504. Knowing the surface area of electrodes 502 and 504 and a separation distance of electrodes 502 and 504, the resistivity of the water is calculated by main control processor 410. Knowing the resistivity of the water calculated, that value is converted to conductivity by taking the reciprocal (conductivity being the reciprocal of resistivity).

Resistivity is commonly represented by the Greek letter p (rho). The SI unit of electrical resistivity is the ohmmeter ($\Omega \cdot m$). For example, a 1 $m^3$ solid cube of a material with sheet electrodes of area 1 $m^2$ each, separated by 1 meter (m), and the resistance between these contacts is 1$\Omega$ then the resistivity of the material is 1 $\Omega \cdot m$.

The basic unit of conductance is the Siemen (S). The Siemen is the reciprocal value of the unit of resistivity, so it is equal to 1/(1 $\Omega \cdot m$). So, at a resistivity of 1, the resistance is 1 and the conductivity is also equal to 1, as shown at 600 in FIG. 6.

But a base unit value of 1 for conductivity is much higher that occurs with natural water. Also, large sheet electrodes of surface area 1 $m^2$ and a wide separation distance of 1 m is not practical for most applications, scaled-down units of measure are used.

Microsiemens ($\mu S/cm$) and millisiemens (mS/cm) are widely used in industry as more suitable base units of measure: 1 $\mu S/cm$=0.001 mS/cm=0.000001 S/cm.

Microsiemens ($\mu S/cm$) and millisiemens (mS/cm) are typically just abbreviated as $\mu S$ and mS where the cm is well understood to those skilled in the art.

Since the geometry of the water quality sensor probe 501 affects the resistivity measurements, the conductivity (G) calculated from the measured resistivity must be corrected if the distance between the probes is not exactly 1 cm and the surface area of the probe 501 is not exactly 1 cm. The corrected value is referred to as the "Specific Conductivity (C).

The geometry of probe 501 is referred to as the "cell constant" (K). The cell constant is equal to: (the distance between the electrodes)/(surface area of an electrode). If K=1, there is no correction in effect.

Once the specific conductivity has been determined, the TDS can be calculated. There are two standard methods for calculating TDS based on specific conductivity based on EC-to-TDS conversion factors:

0.5 (NaCl)
0.7 (442)

Commonly cited references suggest that to determine the actual TDS value, the EC value is multiplied by 1000 and divide that number by 2. To calculate the EC value, multiply the parts per million (ppm) value by 2 and divide by 1000. Table 1 shows a comparison of this relationship, using the two methods.

TABLE 1

| Electrical Conductivity (EC) | | Total Dissolved Solids (TDS)* *Results displayed in parts per million (ppm), and parts per thousand (ppt) | | | |
|---|---|---|---|---|---|
| mS/cm | μS/cm | NaCl Conversion (0.5) | | 422 Conversion (0.7) | |
| 1.0 | 1000 | 500 ppm | 0.50 ppt | 700 ppm | 0.70 ppt |
| 1.5 | 1500 | 750 ppm | 0.75 ppt | 1050 ppm | 1.05 ppt |
| 2.0 | 2000 | 1000 ppm | 1.00 ppt | 1400 ppm | 1.40 ppt |
| 2.5 | 2500 | 1250 ppm | 1.25 ppt | 1750 ppm | 1.75 ppt |
| 3.0 | 3000 | 1500 ppm | 1.50 ppt | 2100 ppm | 2.10 ppt |

Figure 7:
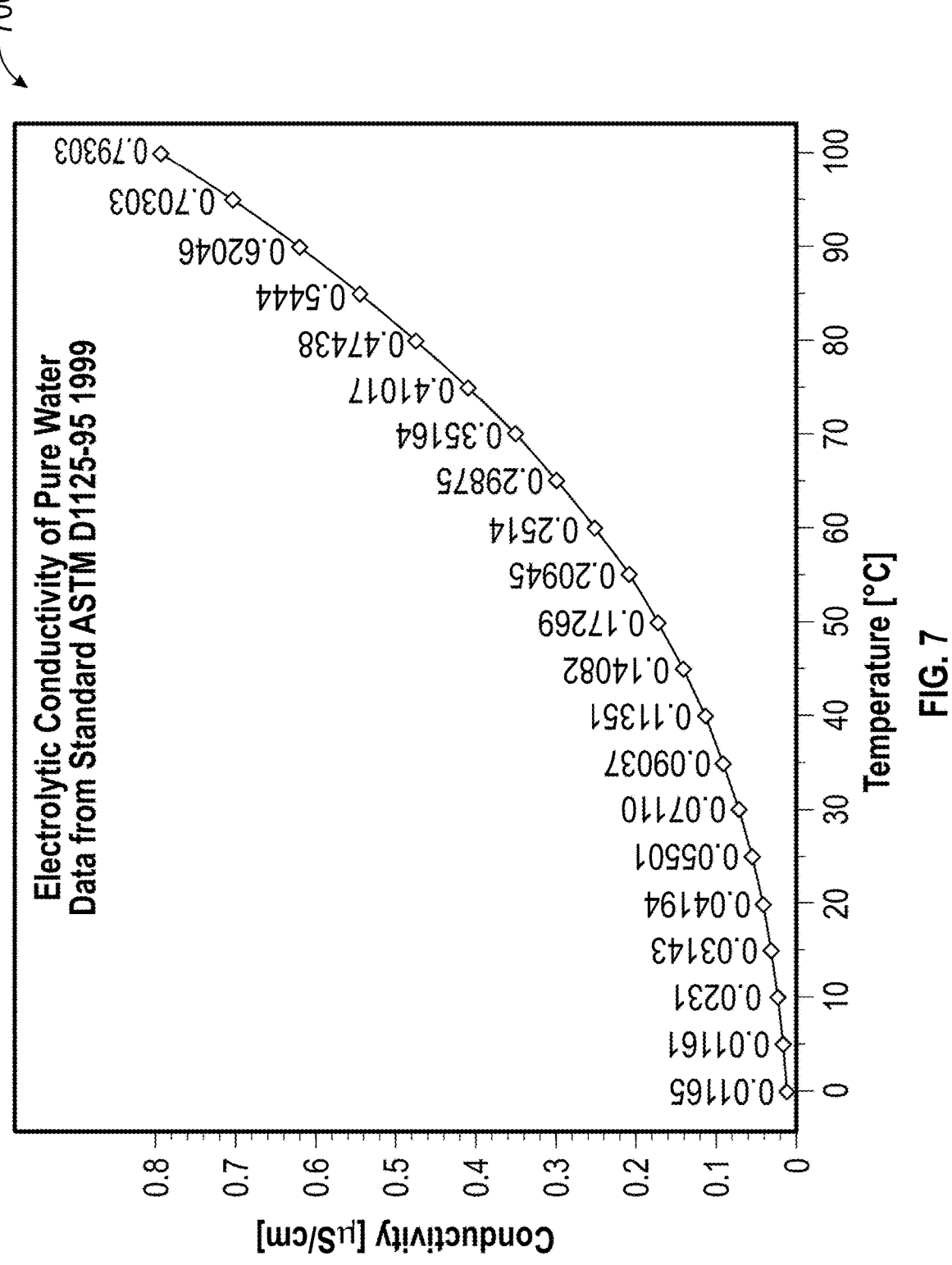
FIG. 7 illustrates how water conductivity increases with increasing temperature.

However, this is an over-simplification. The conversion factors are not fixed, but are non-linear factors, dependent on the temperature of the water being measured. There is a direct relationship between conductivity of water and the water temperature. Water conductivity increases with increasing temperature, as shown at 700 in FIG. 7.

For high-accuracy measurement, temperature-adjusted EC-to-TDS conversion factors are established specific to the measurement circuitry and may either be based on curve fitting to generate a non-linear equation for use in calculating real-time or determined empirically once and then established as a look-up table.

Figure 8:
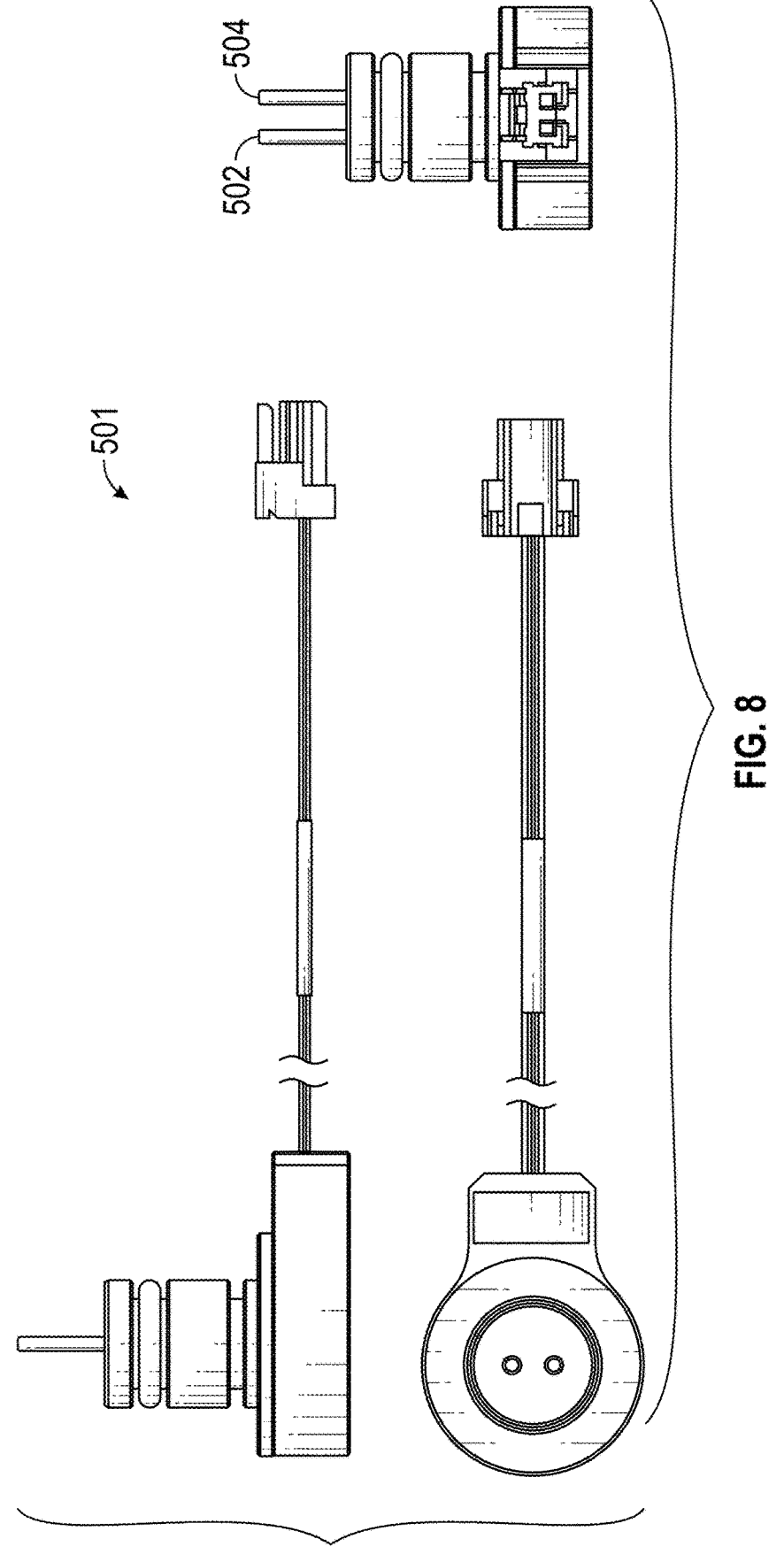
FIG. 8 illustrates views of the water probe.

An example of design specifics for probe 501 suitable for whole home continuous water quality monitoring is listed in Table 2 and shown in FIG. 8, and associated calculations are shown at 900 in FIG. 9.

TABLE 2

| Parameter | Requirement | Comments |
|---|---|---|
| Type of fluid | Water (cool/cold) | Tap water |
| Applied Power | 0-1voe @2.5 kHz, 1 mA max | |
| Max Operating temperature | I60 deg F. (70 deg C.) | |
| Maximum Operating Pressure | 150 PSI (10 bar) | |
| Usage Rating | Continuous | |
| Electrodes | Nickel-plated steel | (x2) |
| Cable | 2-conductor, 26AWG stranded, jacketed | |
| Connector | Molex, 5055700261 | |
| Service Life/Reliability | 2 years, continuous immersion | (Field replaceable) |
| Health/Safety | NSF/ANSI Standard 61 compliant | Drinking Water Req |

Another aspect of the disclosure is a solution for generating a stimulus signal in microcontroller-based water quality detector 500 that advantageously produces an oscillating current flow between electrodes 502 and 504 using a single rail power supply and requiring only a single data acquisition channel for measurement. Such characteristics are highly desirable for low-cost limited resource electronic designs.

Since EC involves measuring conductance (the inverse of resistance), it would seem possible to just use standard voltmeter techniques to perform the measurement. However, this is not the case. The problem is that DC current flowing in a continuous single-direction results in one probe electrode with a continuous positive (+) charge and the other probe electrode with a continuous minus (−) charge. This polarization causes migration of the ions in the water as they are attracted to either of the charged electrodes 502 and 504, resulting in their accumulation on the probe electrode surfaces, which produces measurement errors. For this reason, a dual rail power supply and an AC stimulus voltage is one solution to prevent the accumulation of charge on either of the probe electrodes. However, this has the disadvantage of requiring a dual rail power supply and associated dual supply electronics to generate the AC waveform.

Figure 10:
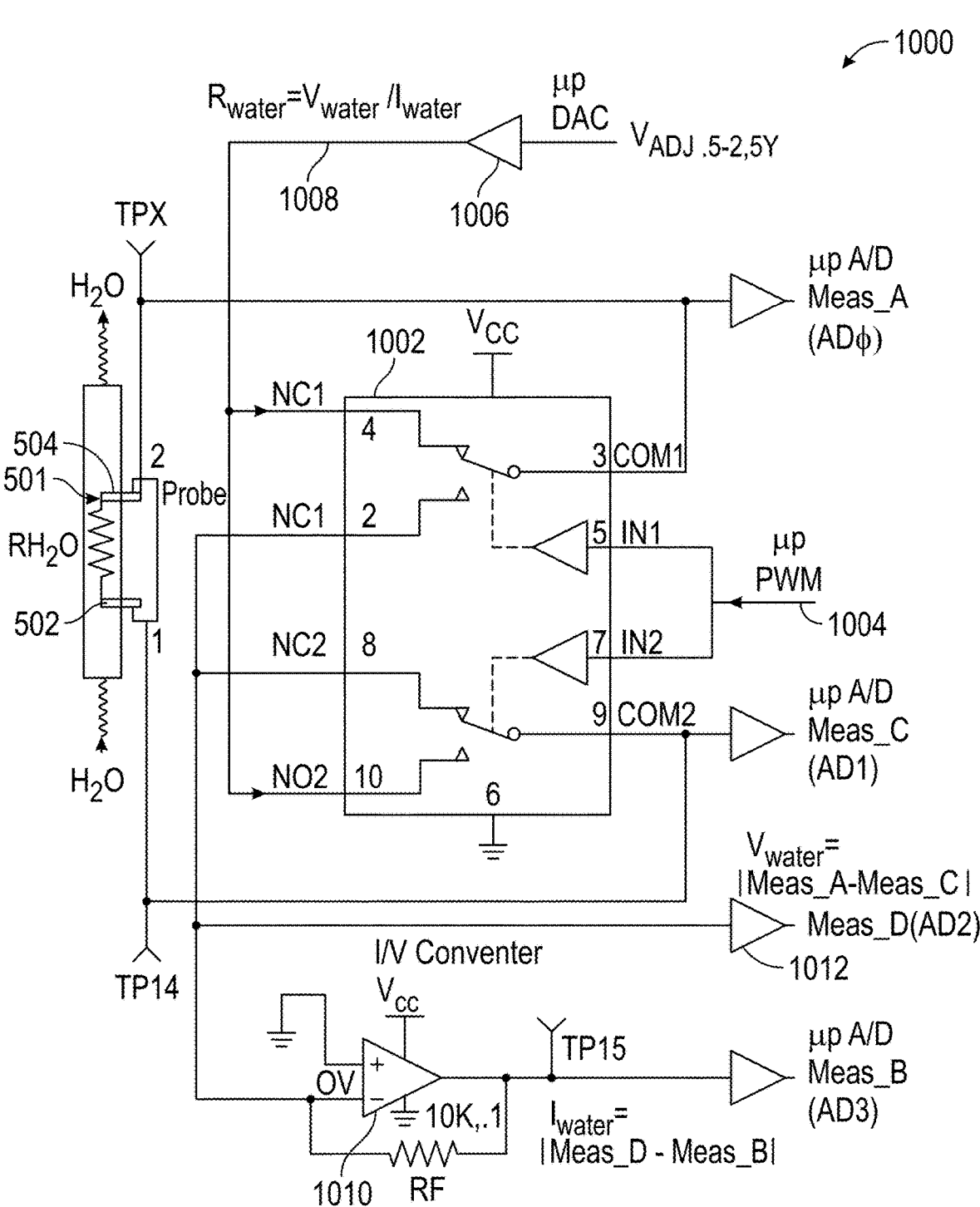
FIG. 10 illustrates the circuit using a single rail power supply VCC provided via connector.
Figure 11:
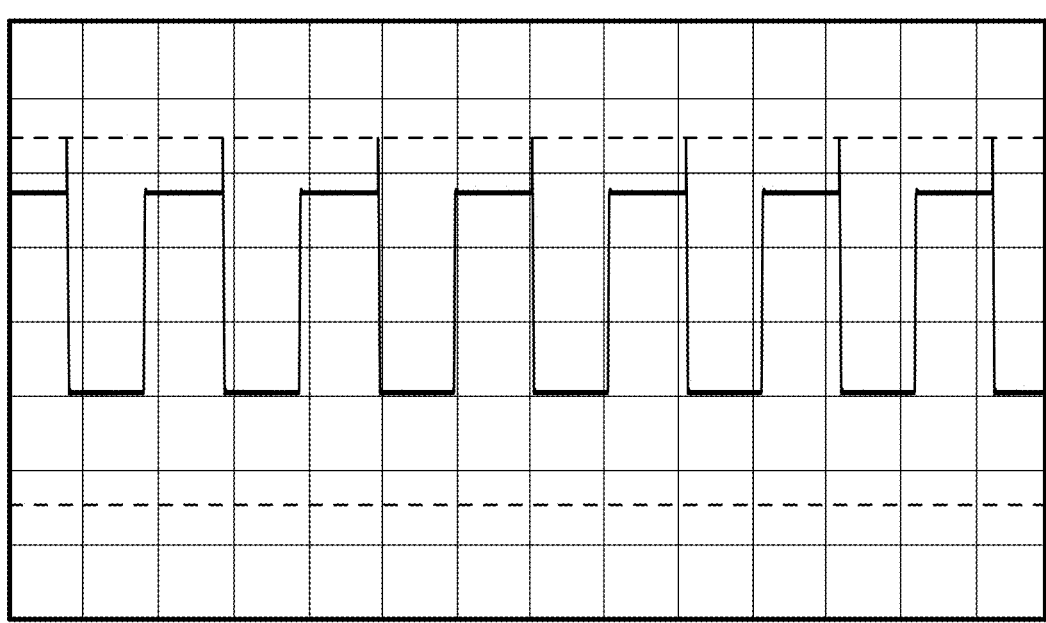
FIG. 11 and FIG. 12 illustrate associated waveforms of the circuit.
Figure 12:
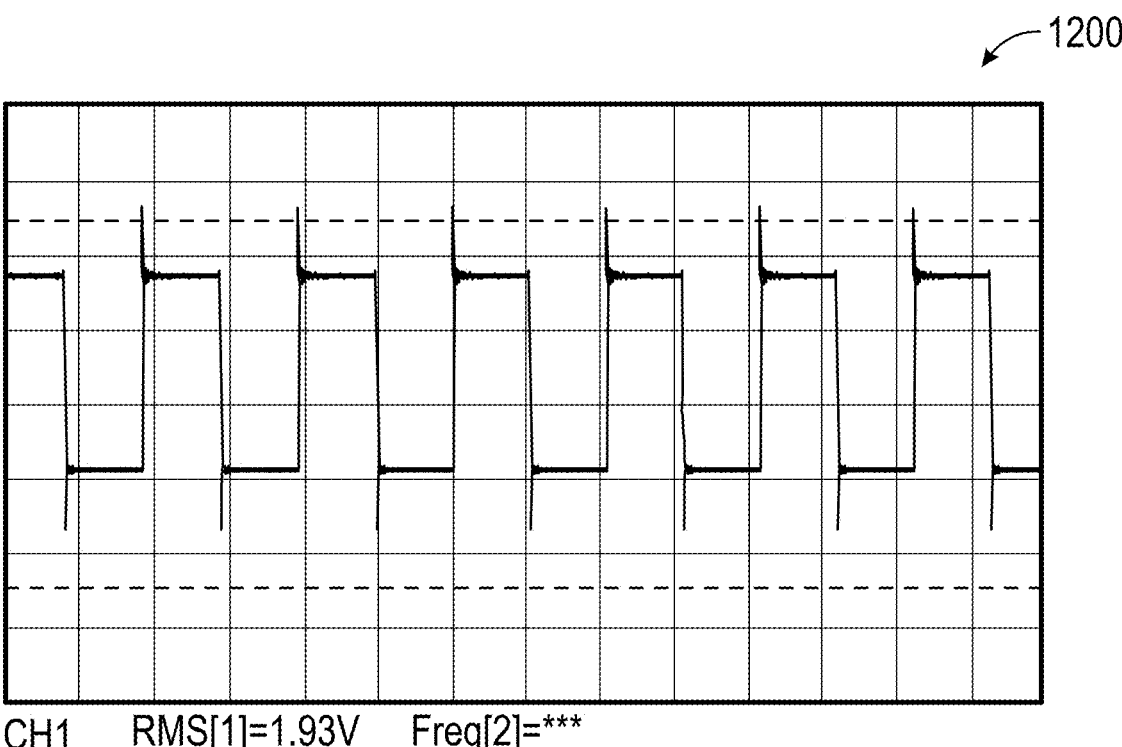

This disclosure includes circuit 1000 shown in FIG. 10 which uses a single rail power supply VCC provided via connector 430 where the housing 404 is electrically non-conductive, such as plastic, and is not grounded. Associated waveforms are shown at 1100 in FIG. 11 and at 1200 in FIG. 12. This stimulus signal design utilizes a 2-channel analog switch 1002, such as a SPOT analog switch, to switch the relative polarity of electrodes 502 and 504, so that current flow reverses between the electrodes 502 and 504 and thus charge continuously rebalances as the circuit 1000 operates and does not accumulate on either electrode 502 or probe electrode 504. An example of a suitable switch is the Texas Instruments TS5A22362.

The switch 1002 is driven by a pulse width modulated (PWM) signal 1004 provided by the main control processor 410 to the input control lines IN1 and IN2 on the analog switch 1002. The PWM signal 1004 causes the voltage polarity at electrodes 502 and 504 to reverse at the frequency of the PWM signal 1004. The frequency of the PWM signal 1004 must be high enough to prevent ions from migrating from one electrode to the other as the polarity of the applied voltage switches. A minimum frequency of 1 kHz accomplishes this.

It is important that the PWM signal 1004 be as symmetrical as possible and adjusted accordingly by main control processor 410 so that in measuring the DC (RMS) voltage, between the electrodes 502 and 504, the voltage measures 0 VDC.

A further aspect of the circuit 1000 is that a digital to analog converter (DAC) 1006 provides an adjustable voltage level signal 1008 such that the switched voltage may be optimally adjusted (not fixed) in amplitude for signal integrity and to minimize the current flow through the water, thus further reducing ion attraction and migration to each electrode 502 and 504.

An operational amplifier (op amp) 1010 in a current-to-voltage (I/V) converter configuration completes the stimulus path and feeds the current measurement signal to the main control processor 410 as a DC voltage that directly correlates to the current flow.

High-Accuracy TDS Measurement:

$$\text{Resistance of water } Rwater = Vwater/Iwater$$

$$\text{Voltage across water } Vwater = |AD0 - AD2|$$

$$\text{Current in water } Iwater = |AD2 - AD3|$$

Single Sensing Channel TDS Measurement:

TDS measurement is provided on at AD2 only.

Circuit 1000 has the further advantage of requiring only a single sensing channel to perform the TDS measurement in a minimalist implementation of the solution. When the PWM waveform 1004 is at the logic high half of its cycle, the connections through the analog switch 1002 are such that the single sensing channel shown at 1012 in FIG. 10 as "Meas_D" provides voltage sensing that is used by main processor 410 to calculate both the voltage across the electrodes 502 and 504 and also the voltage that correlates to the current measurement. With the applied reference voltage 1008 from the DAC 1006 being a known value, the EC is determined by main processor 410 from the measurements on this single sensing channel 1012.

Circuit 1000 is suitable for use in determining TDS in applications where the water vessel housing 404 is non-conducting non-grounded such that it may not be tied to earth ground. This prevents stray current paths from forming between the measurement electrodes 502 and 504 and the vessel walls that would adversely affect the TDS measurements.

To address the technical challenge that conversion factors are not fixed (non-linear, dependent on the temperature of the water being measured), the temperature and pressure sensor 416 inherent to the whole home water monitoring system pressure sensor is leveraged to provide the main control processor 410 with continuous real-time water temperature and pressure monitoring. Water temperature measurements are used by the main control processor 410 in a non-linear equation to calculate temperature-adjusted EC-to-TDS conversions in real-time, thus maintaining measurement accuracy across the typical water source temperature range.

The synergistic combining of the capabilities of leak detection with real-time continuous water quality analysis, enables a new solution category not previously practical. "whole-home water monitoring".

With whole-home water monitoring, the combined sensing package and network connectivity, enables homeowners to monitor and assess all aspects of their water usage—not just leak detection and flow data. Water quality analysis provides a critical missing piece of information that homeowners need to effectively manage their water supply.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:

1. A fluid quality detector, comprising:
a body configured to communicate a fluid between an inlet and an outlet, wherein the body is not grounded;
a probe having a pair of electrodes configured to communicate with the fluid;
a circuit coupled to the probe and configured to determine a quality of the fluid as it communicates between the inlet and the outlet using solely a single sensor channel that is configured to calculate both a voltage across the electrodes and also a voltage that correlates to a current measurement, wherein the circuit is configured to:
apply a voltage waveform between the two electrodes to the fluid, wherein the voltage waveform has a frequency 1000 hertz or above configured to prevent ions from migrating between the electrodes;
switch a voltage polarity of the voltage waveform to reverse voltage polarity at the electrodes and reduce ions from migrating between the electrodes;
wherein the circuit is configured to determine the fluid quality by measuring total dispersed solids (TDS) from electrical conductivity (EC) between the electrodes using solely the single sensing channel while switching the voltage polarity of the voltage waveform.

2. The fluid quality detector of claim 1, wherein the voltage waveform is configured to be created by a pulse width modulated (PWM) signal.

3. The fluid quality detector of claim 1, wherein the circuit is configured to operate from a single rail voltage and the housing is electrically non-conductive.

4. The fluid quality detector of claim 1, wherein the circuit is configured to use a selectable reference voltage to determine the EC.

5. The fluid quality detector of claim 4, wherein a digital to analog converter (DAC) is used to establish the selectable reference voltage.

6. The fluid quality detector of claim 1, wherein the voltage polarity is configured to be switched by an analog switch.

7. The fluid quality detector of claim 6, wherein the analog switch is configured to generate a measuring signal indicative of the fluid quality on the single sensor channel.

8. The fluid quality detector of claim 7, wherein the circuit is configured to determine a current generated between the electrodes based on the voltage waveform in the fluid.

9. The fluid quality detector of claim 8, wherein the circuit is configured to use a current to voltage converter to generate the measuring signal from the determined current.

10. A fluid quality detector, comprising:
a body configured to communicate a fluid between an inlet and an outlet, wherein the body is not grounded;
a probe having a pair of electrodes configured to communicate with the fluid;
a circuit coupled to the probe and configured to determine a quality of the fluid as it communicates between the inlet and the outlet using solely a single sensor channel that is configured to calculate both a voltage across the electrodes and also a voltage that correlates to a current measurement, wherein the circuit is configured to:
apply a voltage waveform between the two electrodes to the fluid, wherein the voltage waveform has a frequency 1000 hertz or above to prevent ions from migrating between the electrodes;
determine electrical conductivity (EC) between the electrodes; and
determine the fluid quality by determining total dispersed solids (TDS) based on the determined EC between the electrodes, wherein the circuit determines the fluid quality by measuring total dispersed solids (TDS) from electrical conductivity (EC) between the electrodes using solely the single sensing channel while switching the voltage polarity of the voltage waveform.

11. The fluid quality detector of claim 10, wherein the voltage waveform is configured to be created by a pulse width modulated (PWM) signal.

12. The fluid quality detector of claim 10, wherein the circuit is configured to operate from a single rail voltage and the housing is electrically non-conductive.

13. The fluid quality detector of claim 10, wherein the circuit is configured to use a selectable reference voltage to determine the EC.

14. The fluid quality detector of claim 10, wherein the voltage polarity is configured to be switched by an analog switch.

15. The fluid quality detector of claim 14, wherein the analog switch is configured to generate a measuring signal indicative of the fluid quality on the single channel.

* * * * *